E. C. POOL.
SCALE.
APPLICATION FILED JULY 30, 1910.

1,109,359.

Patented Sept. 1, 1914.

Witnesses
Martin H. Olsen.
Louis B. Erwin.

Inventor
Elmer C. Pool

UNITED STATES PATENT OFFICE.

ELMER C. POOL, OF NEW CASTLE, PENNSYLVANIA, ASSIGNOR TO TOLEDO SCALE COMPANY, OF TOLEDO, OHIO, A CORPORATION OF NEW JERSEY.

SCALE.

1,109,359.  Specification of Letters Patent.  Patented Sept. 1, 1914.

Application filed July 30, 1910. Serial No. 574,617.

*To all whom it may concern:*

Be it known that I, ELMER C. POOL, a citizen of the United States, residing at New Castle, in the county of Lawrence and State of Pennsylvania, have invented certain new and useful Improvements in Scales, of which the following is a specification.

My invention relates more particularly to means for securing a correct reading of the scale in such devices as employ a movable chart of which the cylinder indicating or computing scale is a well known example. In devices of this character in order to secure a correct reading it must be taken off in each instance at a fixed definite reading position. For this purpose the cylinder casing is provided with a vertical sight opening opposite the reading position which is intended to be put on a level with the average observer's eyes and a reading wire or line is mounted near the cylinder chart as nearly as may be in the same horizontal plane as the correct reading position. It is impractical, however, to place the reading line or wire very close to the movable chart but it must be placed at a slight distance therefrom. This would be immaterial if the eye of the observer were always on a horizontal line with the reading line and the correct reading position. However, observers of different height necessarily read the scale from different altitudes above or below the horizontal plane of the reading position and the angle of the vision through the reading line being different, the latter is necessarily projected on the chart in positions above or below the correct reading position according as the eye of the observer is below or above the horizontal plane of the reading position. In order to correct for the position of the eye of the observer I have devised means whereby the reading line is projected upon the correct reading position no matter what the angle of observation of the reader.

I have shown my invention applied to a cylinder scale but it will be obvious that it is of much broader application and is available wherever a reading line and a relatively movable chart are used.

Figure 2:
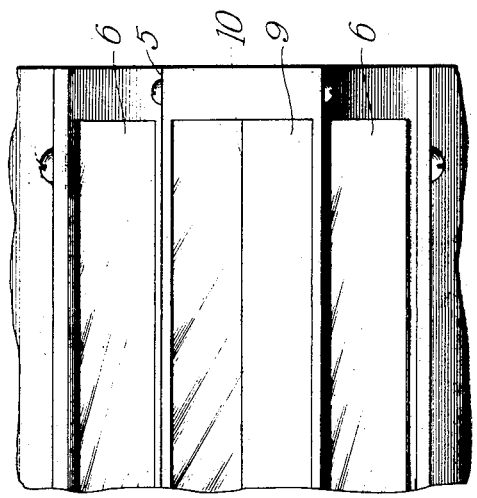
Figure 3:
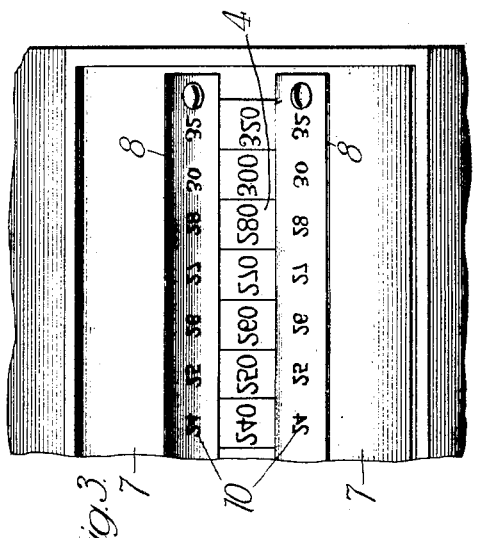
Figure 1:
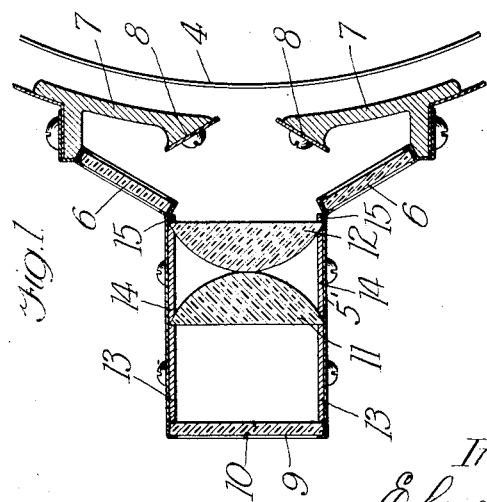

In the drawing Figure 1 shows a vertical section of a fragment of a cylinder chart and casing with my invention applied thereto; Fig. 2 is a front elevation; and Fig. 3 a similar view with parts removed to better show the interior.

The chart 4 may be of any usual or suitable type and is inclosed in the customary casing 5 having an opening in the cylindrical wall thereof at a point opposite the correct reading position. Opposite to the reading position is mounted a sight tube 5' which consists substantially of a rectangular oblong boxing extending the length of the cylinder and open toward the cylinder and at its opposite end. Between the sight tube and the edges of the cylinder casing on either side of the reading position are mounted windows which may consist of panes of glass 6, 6 arranged at an angle as shown in Fig. 1. The edges of the opening in the cylinder casing are provided with reinforcing strips 7, 7 which may be of cast metal, extend toward each other and are provided at their inner ends with inclined faces on which are mounted price scale strips 8, 8. These strips are arranged on either side of the reading position and within view through the sight tube. The outer end of the sight tube is closed by a pane of glass 9 upon which is drawn the reading line 10 extending horizontally across the pane. Of course a reading wire or similar means might be employed instead of the line upon the pane for the same purpose. Within the sight tube is arranged a pair of lenses 11, 12 each of which is plano-convex, the convex faces being arranged toward each other. Each of these lenses is of uniform cross section throughout its length and its curved surface is generated by a straight line moving in a parabola without changing its direction. The arrangement of lenses and reading line is such with reference to the movable chart that the reading line and the correct reading position on the chart are in respective conjugate focal lines of the lens system. It will be clear therefore that whatever the position of the observer's eye, whether above or below the horizontal plane of the correct reading position the reading line will be projected on the cylinder chart in the correct reading position.

While I have shown a system of two lenses it is clear that a greater number might be employed and the same result secured provided the parts were so arranged that the reading line and correct reading position were located substantially in the focal lines of the system. The lenses are held in place in the sight tube by suitable strips and spacers 13, 14, 15, which may be secured by screws as shown. The sight tube and the framing for the windows are shown as made of sheet metal properly bent to shape though this precise construction is immaterial.

In certain of the following claims I have referred to the lenses as cylindrical but it will be understood that they may be of paraboloidal or other similar cross-section without departing from my invention, the term cylindrical being used for convenience to include similar forms capable of obtaining the same result.

What I claim is:

1. In a scale the combination of a movable chart, an element bearing a reading line and lens system, the parts being so related and arranged that an image of the appropriate element of the chart is projected into coincidence with the reading line.

2. In a scale provided with a movable reading chart, a casing inclosing the same but having a sight opening, an element bearing a reading line and a lens system intermediate the reading line and chart, the parts being so related and arranged that an image of the appropriate element of the chart is projected into coincidence with the reading line.

3. In a scale, the combination of an element bearing a reading line, a chart movable relative thereto, and a cylindrical lens system so arranged that the reading line and correct reading position on the chart respectively occupy the conjugate focal lines of the lens system.

4. In a scale, the combination of an element bearing a reading line, a chart movable relative thereto, and a pair of plano-convex cylindrical lenses constituting a system, the relation of the parts being such that the reading line and the correct reading position on the chart of the scale occupy the conjugate focal lines of the lens system.

5. In a scale, the combination of a chart, a casing therefor having a sight opening opposite the reading position, a reading tube covering the sight opening, and a window adjacent thereto for admitting light to the reading position.

6. In a scale, the combination of a movable chart, a casing therefor having a sight opening, a reading tube, an element bearing a reading line arranged across the tube, a lens system for projecting the reading line in correct reading position on the chart and a window adjacent the correct reading position for admitting light thereto.

7. In a scale, a movable chart, a casing surrounding the same having an opening opposite the reading position, a reading tube, an element bearing a reading line mounted in the reading tube, a cylindrical lens system also mounted in the reading tube, the arrangement being such that the reading line and the correct reading position on the chart are substantially in the conjugate focal lines of the lens system, and a price per unit scale adjacent the correct reading position and visible through the reading tube.

ELMER C. POOL.

Witnesses:
 LEONARD M. UBER,
 BESSIE MILLER.